United States Patent
Beniacar

[11] Patent Number: 5,562,221
[45] Date of Patent: Oct. 8, 1996

[54] FOLDABLE BOTTLE WITH FASTENING ELEMENT

[76] Inventor: Giacomo Beniacar, Via C. Troya, 22, 20144 Milano, Italy

[21] Appl. No.: 421,470

[22] Filed: Apr. 12, 1995

Related U.S. Application Data

[63] Continuation of Ser. No. 154,102, Nov. 18, 1993, abandoned.

[30] Foreign Application Priority Data

Nov. 24, 1992 [IT] Italy ................. MI92A2685

[51] Int. Cl.⁶ ................. B65D 1/02; B65D 1/40; B65D 23/08
[52] U.S. Cl. ................. 215/386; 215/12.1; 215/382; 215/900; 220/666; 220/671; 220/6; 220/720
[58] Field of Search ................. 383/18; 215/12.1, 215/1 C, 11.3, 382, 900, 386; 220/666, 6, 720, 671, 8; 222/95, 107, 99; 206/218; 229/1.5 B

[56] References Cited

U.S. PATENT DOCUMENTS

| | | | |
|---|---|---|---|
| 216,227 | 6/1879 | Sedgwick | 220/666 X |
| 1,228,706 | 6/1917 | Smythe | 220/8 |
| 3,280,871 | 10/1966 | Taylor | 220/666 X |
| 3,301,293 | 1/1967 | Santelli | 220/666 |
| 3,319,684 | 5/1967 | Calhoun | 190/107 X |
| 3,424,218 | 1/1969 | Vanderbur, Jr. et al. | 215/1 C X |
| 3,434,529 | 3/1969 | Valtri et al. | 206/218 |
| 3,474,844 | 10/1969 | Lindstrom et al. | 220/666 |
| 3,978,232 | 8/1976 | Dodsworth et al. | 229/1.5 B X |
| 4,157,103 | 6/1979 | La Fleur | 383/18 X |
| 4,158,376 | 6/1979 | Erb | 220/666 X |
| 4,252,256 | 2/1981 | Walsh | 215/900 X |
| 4,456,134 | 6/1984 | Cooper | 215/1 C X |
| 4,592,492 | 6/1986 | Tidmore | 222/209 |
| 4,865,211 | 9/1989 | Hollingsworth | 220/8 |
| 4,930,644 | 6/1990 | Robbins, III | 215/382 |
| 5,080,260 | 1/1992 | During | 222/107 |
| 5,174,458 | 12/1992 | Segati | 220/666 X |
| 5,183,123 | 10/1992 | Senko | 220/666 X |
| 5,226,551 | 7/1993 | Robbins, III | 220/8 |
| 5,240,130 | 8/1993 | Osbakk | 220/666 X |
| 5,255,808 | 10/1993 | Tobler | 215/11.3 X |
| 5,310,068 | 5/1994 | Saghri | 215/1 C X |

FOREIGN PATENT DOCUMENTS

| | | | |
|---|---|---|---|
| 472504 | 2/1992 | European Pat. Off. | 215/1 C |
| 511696 | 4/1992 | European Pat. Off. | |
| 2504095 | 10/1982 | France . | |
| 680429 | 8/1992 | Switzerland | 220/6 |
| 2181062 | 4/1987 | United Kingdom | 215/11.3 |
| 8102286 | 8/1981 | WIPO | 215/1 C |
| 8805014 | 7/1988 | WIPO | 210/666 |

Primary Examiner—Sue A. Weaver
Attorney, Agent, or Firm—Shlesinger, Fitzsimmons & Shlesinger

[57] ABSTRACT

A bottle (10, 110) is made of flexible material which can be folded or rolled up into a deformed configuration of limited dimensions. The bottle comprises, between the pouring neck (14, 114) and side walls (15, 115), elements which engage with a fastening element (17, 117) which can be fitted onto the bottle to keep it in the deformed configuration.

7 Claims, 1 Drawing Sheet

FOLDABLE BOTTLE WITH FASTENING ELEMENT

This application is a continuation of U.S. patent application Ser. No. 08/154,102, filed Nov. 18, 1993, now abandoned.

BACKGROUND OF THE INVENTION

There are known "disposable" bottles made of flexible plastic material which can be folded or rolled up after use to reduce their dimensions. This is useful in order to reduce the volume of waste to be disposed of.

These bottles are usually obtained by blowing, with relatively thin and pliable walls. One of these bottles is illustrated in EPA 525 908.

Unfortunately, due to the elasticity of plastic materials, the minimum dimensions obtained are never as limited as could theoretically be hoped for. In fact, as hard as the user tries to fold it as tightly as possible, the folded bottle always tends to unfold.

It is known to make containers of variable volumes which are held in variously contracted positions by differently shaped elements.

U.S. Pat. No. 4,456,134 provides for laces to be fastened to eyelets on the bottle lateral sides.

U.S. Pat. No. 4,592,492 and U.S. Pat. No. 4,157,103 show lateral protrusions which engage in tape eyelets.

These solutions call for the bottles to be moulded from sufficiently thick plastic material in order to form these types of fasteners, which are not obtainable by blowing. In fact, U.S. Pat. No. 4,157,103 appears to suggest applying the protrusions as separate parts, which is incompatible with the manufacture of disposable bottles. FR 2.504.095 describes a bottle which folds up concertina-fashion with fasteners for the various loops.

These fasteners must be extremely sturdy and require an economically inadmissible use of material.

It has also been suggested to keep highly flexible bottles in the collapsed position by applying an elastic element (for example a rubber ring), as shown in U.S. Pat. No. 3,424,218. This fastening requires a relatively long additional element in elastic material, differing from that of the bottle, thereby rendering the operations of recycling the materials more complicated. The use of an elastic ring makes it difficult to effectively counteract the tendency of the bottle to stretch back into shape.

SUMMARY OF THE INVENTION

The general scope of this invention is to obviate the aforementioned problems by providing a bottle made of foldable plastic material, which can be easily fastened to secure it in a tightly folded position.

This scope is achieved according to the invention by providing a bottle with at least lateral surfaces made of pliable material which enable it to be folded up into a deformed configuration of limited size, provided with engaging members which engage with a flexible element to hold the bottle in the deformed position, characterized by the fact that the bottle is made of blown plastic material and the engaging member consists of a groove made in the portion of wall between the pouring neck and the side walls, to receive the retaining element.

BRIEF DESCRIPTION OF THE DRAWINGS

The innovatory principles of this invention and its advantages with respect to the known technique will be more clearly evident from the following description of possible exemplificative embodiments applying such principles, with reference to the accompanying drawings, in which.

DETAILED DESCRIPTION OF THE INVENTION

Figure 1:
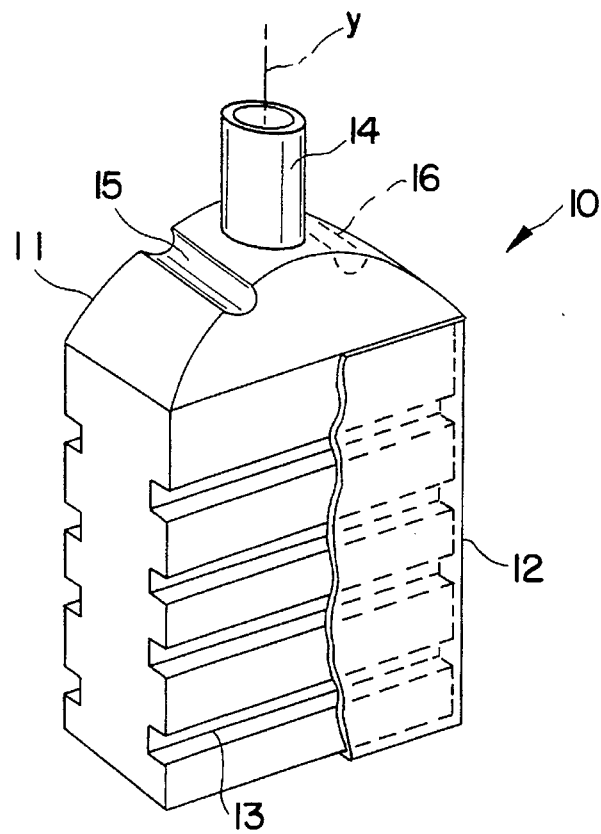
FIG. 1 shows a schematic perspective view of a bottle according to the invention, in a distended or useable condition.

With reference to the figures, FIG. 1 shows a first bottle made according to the invention and generically indicated by reference 10. Said bottle comprises a plastic body 11, made of sufficiently pliable material as to enable the bottle to be folded up. To offer sufficient rigidity during use, the lower portion of the bottle can be housed in a box-shaped casing 12, for example made of cardboard, which can be torn off after use. To facilitate the folding, the bottle can also comprise transversal grooves 13 on its wider sides. The bottle 10 can, for example, be of the roll-up type as described in the Italian patent application MI91A 002 165 filed on 2nd Aug. 1991, which corresponds to U.S. Pat. No. 5,299,700.

According to this invention, the bottle innovatively comprises engaging elements disposed close to its circular pouring neck 14. Said engaging elements for example can be made in the form of a groove 15 disposed transversely of the axis y of the opening in neck 14 of the bottle, and in a crosswise direction to the rolling faces. The term rolling or folding faces is used to indicate the surfaces of the bottle which are rolled or folded up. For example, in the event of the bottle being made in the form of a body of revolution, the rolling faces would be the surfaces that would be obtained by flattening the bottle to enable it to be subsequently rolled or folded up.

To allow the use of more than one fastening elements or even simply for aesthetical purposes, the bottle can be provided with a second or even more grooves 16 disposed symmetrically on the other side of the neck parallel to groove 15. A second groove of this kind is shown schematically by the broken line in FIG. 1.

Figure 2:
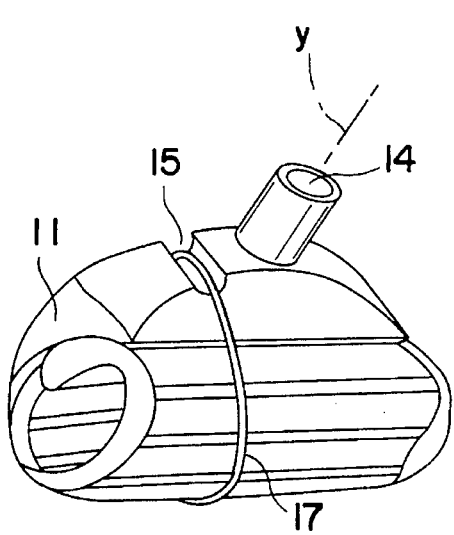
FIG. 2 shows a view of the bottle of FIG. 1 in a rolled up or disposable condition.

As can be seen in FIG. 2, after the bottle has been emptied and the support 12 has been removed, the bottle can be rolled up from the bottom, so that the upper portion near the neck remains on the outside. The rolled up bottle can then be secured with a string or fastening element 17, typically annular, which remains securely in place due to its engagement in the groove 15 and which keeps the bottle in the folded position.

The fastening element 17 can, for example, be made in the form of an elastic ring. The fastening element 17 can advantageously also be made from a non-elastic material. In which case, the elasticity of the bottle in the rolled up condition can be exploited to fit the fastening element in place. In fact, it is sufficient to squeeze the rolled up bottle firmly in order to tighten the spirals. After the fastening element has been fitted in position, the bottle is released, which causes it to expand slightly thereby locking the non-extensible fastening element in place. Making the fastening element non-elastic is also advantageous in that it can be made from the same material as the bottle. This would make it possible to provide homogeneous material in the event of recycling. The fastening element can also be made as a protrusion on the bottle. In this case, as well as in the case of a separate fastening element, the latter can be housed inside the casing 12, for example, between the bottom of the casing and the bottom of the bottle. When the casing is torn off or removed the fastening element is thus available for use.

Figure 3:
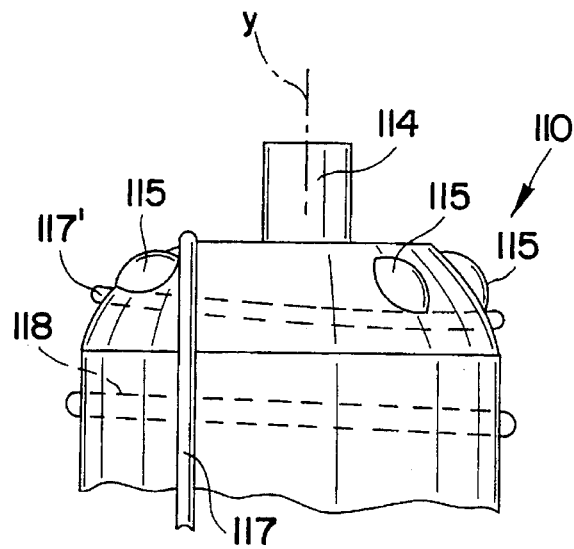
FIG. 3 shows a schematic and partial view of a second embodiment of a bottle according to the invention.

FIG. 3 shows a possible variation. For example, the bottle (generically indicated by reference 110) comprises engaging elements 115 close to the neck 114 made in the form of "bubbles" or projections protruding from the plastic surface. A groove is so formed at the base of the projection, where a string 117 is engaged. Once it has been rolled or folded up, the bottle, which is not necessarily parallelepipedon in shape, but, for example, cylindrical, can thus be secured by means of a fastening element or string 117 similar to the one described for bottle 10. The engaging means prevent the fastening element from slipping off the lateral shoulders on the upper portion of the bottle, which are usually rounded or tapered towards the neck.

If each string is made in the form of a generically ring-shaped element it can be provided disposed around the circumference of the bottle, for example held in place by means of the protrusions disposed at regular intervals around the circumference of the bottle, as shown schematically by the broken line in 117' or housed in a groove as schematically shown in 118. This eliminates the need to provide temporary fastening means such as clips or light gluing during the manufacturing process. This is particularly advantageous whenever the bottle is made without an additional external strengthening case in which to insert the string.

The foregoing description of embodiments applying the innovatory principles of this invention are obviously given by way of example in order to illustrate such innovatory principles and should not therefore be understood as a limitation to the sphere of the invention claimed herein.

For example, it is obvious that the shape of the bottle can differ from the one shown. Moreover, the engaging elements defining a groove close to the neck designed to prevent the string from slipping off the bottle can be of various shapes.

As described in the aforementioned patent application, the material used for manufacturing the bottle can also have differentiated degrees of pliancy, to make it easily foldable and at the same time relatively rigid during use. For example, the upper neck portion and the engaging means for holding the string in place can be made more rigid than the foldable lateral walls. Coupling means can also be provided to secure the bottle to the external casing 12.

Although the term bottle has been used, this term is obviously used to refer to a generic container with an upper pouring neck or aperture.

The bottles according to the invention can obviously be folded in any way whatsoever and not necessarily rolled, the term folded being understood as rolled, bent zig-zag or concertina fashion or in any other way which compacts and reduces the dimensions of the bottle by hand or using any suitable device.

The fastening element 17, 117 can also be temporarily secured to the bottle by trapping it under a label stuck onto the bottle.

What is claimed is:

1. A blow molded bottle having at least two opposed, spaced side walls, and an upper end containing a pouring neck having therein a circular opening communicating with the space between said two opposed, side walls of the bottle, said bottle being made of pliable material which enables the lower end of the bottle to be folded repeatedly upwardly toward said upper end thereof from an undeformed configuration into a deformed, multi-fold configuration of limited size, and a flexible fastening element to hold the bottle in the deformed configuration, and characterized in that the bottle is made of blown plastic material having formed in a portion of said upper end of the bottle a groove located adjacent to one side of said pouring neck and extending transversely of the axis of said pouring neck, and in a direction crosswise of the folds produced in the bottle in its deformed configuration, said groove being disposed to receive and retain therein crosswise of said folds a portion of said fastening element when said element is employed to hold the bottle in its deformed configuration.

2. A bottle as claimed in claim 1, characterized in that the fastening element is a ring-shaped element which surrounds the bottle in its deformed configuration.

3. A bottle as claimed in claim 2, characterized in that when the bottle is in its undeformed configuration the ring shaped element is fitted around the circumference of the bottle.

4. A bottle as claimed in claim 1, characterized in that the fastening element is made from the same plastic material as the bottle.

5. A bottle as claimed in claim 1, characterized in that said fastening element is stored inside a removable casing covering at least part of the bottle when the bottle is in its undeformed configuration.

6. A bottle as defined in claim 1, wherein intermediate said upper and lower ends thereof, said bottle is rectangular in cross sectional configuration.

7. A bottle as defined in claim 1 characterized in that a further groove is formed in said upper end of the bottle adjacent the opposite side of said pouring neck, said further groove extending parallel to the first-named groove.

* * * * *